United States Patent [19]

Cocca

[11] Patent Number: 4,998,186
[45] Date of Patent: Mar. 5, 1991

[54] DECORATIVE HAIR ORNAMENT

[76] Inventor: Lorraine Cocca, 3525 S. Ocean Blvd. #204, Boca Raton, Fla. 33431

[21] Appl. No.: 259,054

[22] Filed: Oct. 18, 1988

[51] Int. Cl.$^5$ .............................................. F21L 15/08
[52] U.S. Cl. .................................. 362/103; 362/104; 362/105; 362/32; 132/275
[58] Field of Search ............... 362/103, 104, 105, 106, 362/32; 132/275

[56] References Cited

U.S. PATENT DOCUMENTS

| | | | |
|---|---|---|---|
| D. 182,102 | 2/1958 | Behr | D86/10 |
| 2,149,170 | 2/1939 | Gould | 2/68 |
| 2,546,945 | 3/1951 | Gaffield | 362/104 |
| 2,670,570 | 3/1954 | Graizda | 46/172 |
| 2,724,769 | 11/1955 | D'Arbeloff | 362/105 |
| 2,798,148 | 7/1957 | Di Lizio et al. | 362/103 |
| 3,211,160 | 10/1965 | Miller | 132/275 |
| 3,441,032 | 4/1969 | Bunett | 132/275 |
| 3,450,872 | 6/1969 | Aiello Jr. | |
| 3,501,628 | 3/1970 | Madden | 367/104 |
| 3,549,878 | 12/1970 | Bailey | 362/104 |
| 3,564,583 | 2/1971 | Klugmann | 132/53 |
| 3,675,005 | 7/1972 | Curiel | 362/103 |
| 3,758,771 | 9/1973 | Frohardt et al. | 240/64 W |
| 3,766,376 | 10/1973 | Sadacca et al. | 362/32 |
| 3,984,674 | 10/1976 | Guetta | 362/104 |
| 4,009,381 | 2/1977 | Schreiber et al. | 362/104 |
| 4,604,760 | 8/1986 | Coin | 362/104 |
| 4,912,944 | 4/1990 | Crosley et al. | 132/275 |

Primary Examiner—Ira S. Lazarus
Assistant Examiner—Sue Hagarman
Attorney, Agent, or Firm—Eckert, Seamans Cherin & Mellott

[57] ABSTRACT

A decorative hair ornament is provided utilizing optic fibers attached to the means of fastening the ornament to the hair. A plurality of optic fibers are extended outwardly controlled by a light source including a battery and diode. Decorations such as gemstones, artificial flowers, and the like are provided to conceal the elements of the light source for the fiber optics.

19 Claims, 3 Drawing Sheets

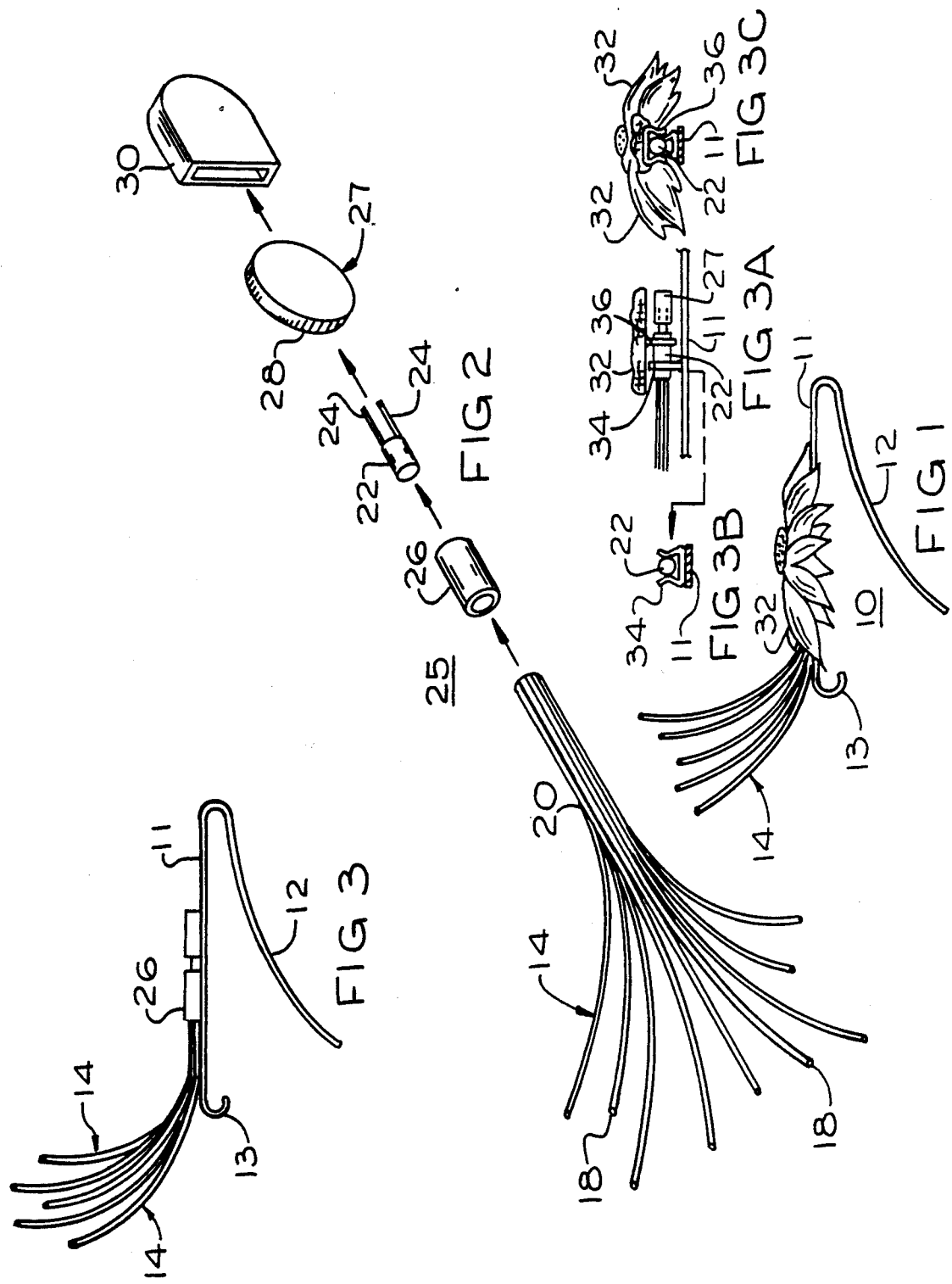

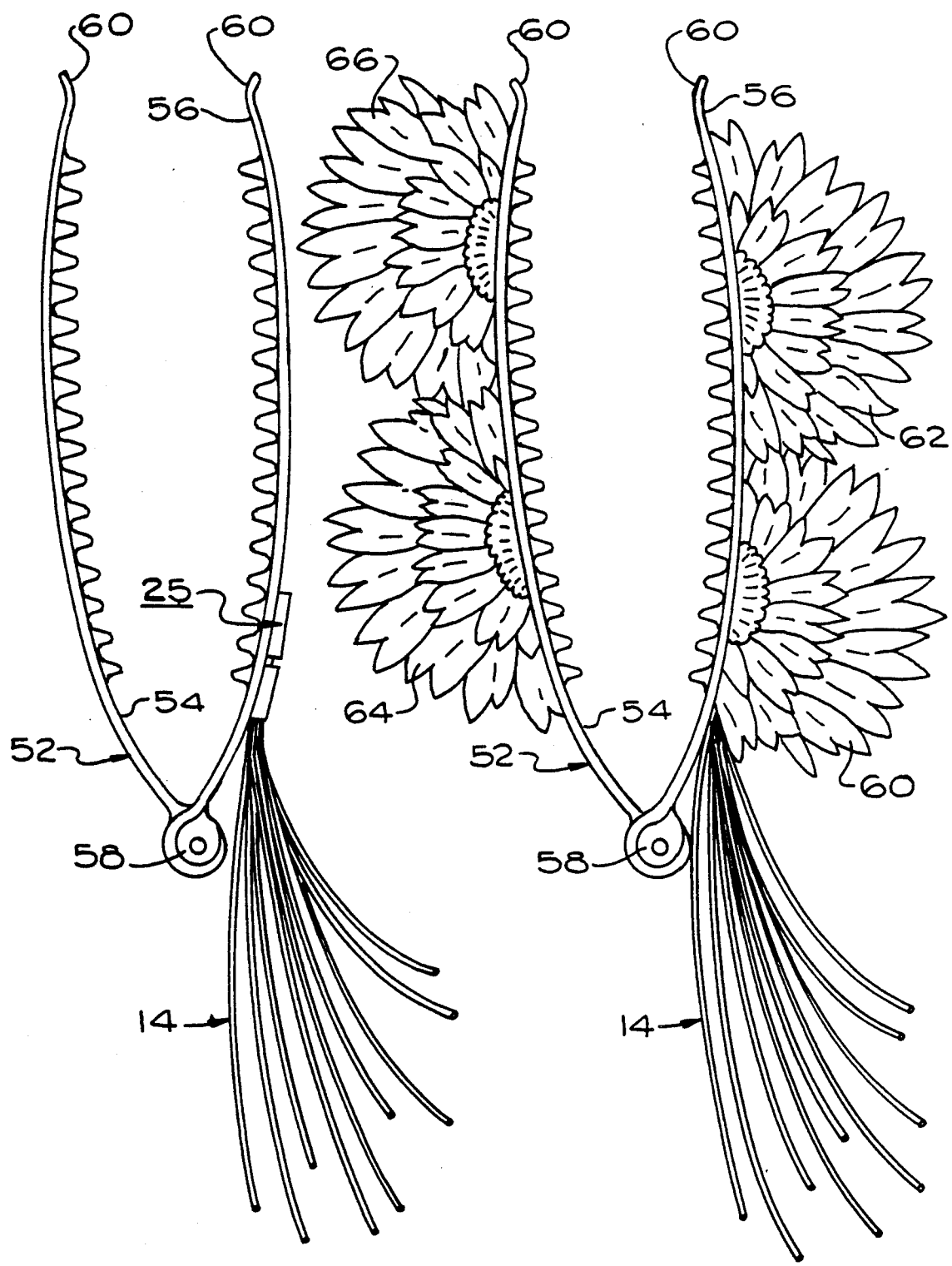

DECORATIVE HAIR ORNAMENT

Background of the Invention

1. Field of the Invention

The invention relates generally to decorations for the hair and more particularly to a decorative hair ornament preferably utilizing fiber optics as an integral part of the ornament.

2. Description of the Prior Art

Hair decorations of many varieties are well known in the art. Such decorations are normally held by hair barrettes, clips, combs, or other variety of means used to temporarily secure ornaments or decorations to the hair.

Specifically, illuminating ornamentation and decorations are also known in the prior art. For example, U.S. Pat. No. 3,501,628, discloses an illuminated hair ornament that provides tiny lamps placed throughout the hair to give an illuminated or sparkling effect. The lamps are operated by a battery housing through the use of concealed wires which are connected thereto. The device tends to be cumbersome and is a problem in that considerable attention must be paid to properly placing the device and the individual lamps in one's hair.

In somewhat similar fashion, the device of U.S. Pat. No. 3,758,771, is used to illuminate a wig through the use of fiber optic members. The light emitting ends of the fibers are interspersed throughout the hair and connect to a miniaturized light source made of a battery, an electric lamp, and a switch. The device is cumbersome and not practical for routine use to decorate the hair.

Accordingly, within the prior art there have been no ornamentation devices that feature an illuminated effect yet which can be quickly and efficiently attached to the hair. The devices of the prior art because of their designs must be very carefully placed in one's hair so as to conceal either wires, a light source, or a combination of elements that are not intended to be a part of the sought after aesthetic effect.

Summary of the Invention

Accordingly, it is an object of the invention to provide a decorative hair ornament that is attractive and easy to attach to the hair.

It is another object of the invention to provide a decorative hair ornament that utilizes optic fibers in a decorative pattern.

It is still another object of the invention to provide a decorative hair ornament in which the light source for the fiber optics is attached to the ornament and concealed from view by decorative means such as gemstones, artificial flowers and the like.

These and other objects are accomplished by a decorative hair ornament utilizing optic fibers. The fibers may be inserted into a protective tubing containing a light emitting diode. The diode is adhered to hair fastening means by an adhesive, detachable means, or other convenient means. A battery, such as a small 3.5 volt watch battery, is encased with an opening to allow the prongs of the diode to engage the battery. When the prongs of the diode are placed into contact with the battery light is emitted through the optic fibers.

Decorative means such as gemstones, flowers, or fabric designs can be provided to cover the housing for the diode and battery thereby providing an ornament combining the fiber optics and hair fastening means.

Description of the Drawings

In accordance with these and other objects which will become apparent hereafter, the invention will now be described with reference to the accompanying drawings in which:

FIG. 1 is an elevational view showing a decorative hair ornament in the form of a hair clip which is constructed in accordance with the invention;

FIG. 2 is an exploded perspective view of the fiber optics and light source which are used in the construction of the ornament of FIG. 1;

FIG. 3 is a plan view showing the light source of FIG. 2 as attached to the clip of FIG. 1 prior to mounting of further decorative means of FIG. 1;

FIG. 3A is a cutaway plan view of an alternative embodiment of the ornament of FIG. 3 showing a different attachment means;

FIG. 3B is a sectional view of the attachment means of FIG. 3A;

FIG. 3C is another sectional view of the attachment means of FIG. 3A;

FIG. 6 is a plan view of a comb with light source and fiber optics mounted thereto; and, FIG. 7. is a further plan view of the comb of FIG. 6 with further decorative elements mounted thereto.

Detailed Description of the Preferred Embodiments

Figure 4:
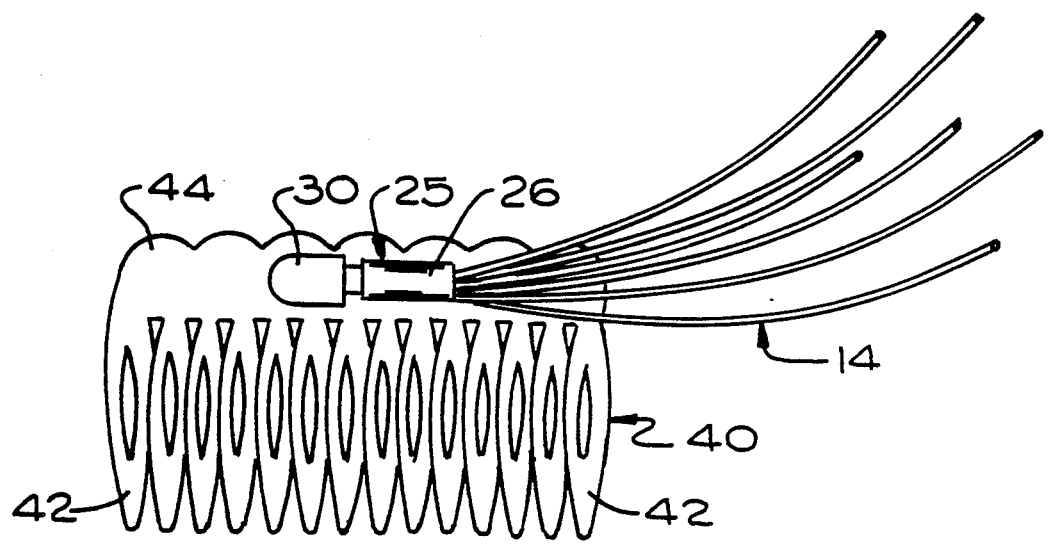
FIG. 4 is a plan view of a barrette with a light source mounted thereto.

With reference to FIG. 1, a hair ornament 10 is shown having a standard hair clip 11 as a means of attachment of the ornament to the hair. The clip 11 includes a spring member 12 which fits under retainer 13 so as to be attachable to the hair in customary fashion.

With further reference to FIG. 1 in combination with FIGS. 2 and 3, polyoptic fibers 14 are disclosed having nodes 18 and stems 20. With further specific reference to FIG. 2, the fibers 20 are to be engaged against light emitting diode 22. The diode 22 is standard with prongs 24 to be engageable with an energy source. The fibers 14 are held in engagement with diode 22 by means of a piece of shrink tubing 26 that is slipped over the bulb of the diode. Heat is then applied to shrink the tubing for a tight fit which can be further enhanced by a dab of adhesive.

As can further be seen from FIG. 2, the prongs 24 of diode 22 can be engaged in battery 27 having receptacles 28 for receipt of the prongs. The battery is intended to be a 3.5 volt watch battery or similar comparable battery. A rubberized or plastic casing 30 is shown in which the battery 27 may be housed. The combination of the elements of FIG. 2 may be referred to as light unit 25.

With reference to FIG. 3, the shrink tubing 26 is shown mounted to clip 11, preferably hot glued or suitably attached by other standard means. The attachment or bonding of the shrink tube 26 and hence the diode 22 and fibers 14 is accomplished in such manner that battery 27 and its casing 30 can be slipped into and out of engagement with the diode unit when desired to provide illumination of the ornament by illuminating the nodes 18 of fibers 14.

With further reference to FIG. 1, a complementary ornamentive piece 32 in the form of a fabric flower is shown as applied to conceal the diode 22 as covered by shrink tubing 26. The decorative unit 32 may be permanently mounted to the shrink tubing 26 in such manner as to extend over and cover the battery 27 as covered by battery casing 30 when in position to provide illumination.

With reference to FIGS. 3A-3C, an alternative means of mounting of diode 22 and complementary ornamentive piece 32 is shown. As best seen in FIG. 3A and 3B, a spring clip 34 is attached to hair clip 11 preferably by gluing. The diode 22 with shrink tubing 26 of FIG. 1 is snapped into place within spring clip 34. As best seen in FIG. 3A and 3C, the decorative piece 32 also has a spring clip 36 mounted thereto preferably by gluing. The decorative piece 32 is shown in FIG. 3A without its petals so as not to hide diode 22 and battery 27. Once the diode 22 is snapped against hair clip 11, the decorative piece 32 can be clamped on diode 22 to conceal from view the diode 22 and battery 27, once the latter is attached.

It will be appreciated that interchangeability of units is enabled by the use of clips 34 and 36 of FIGS. 3A-3C. The diode 22 can be clipped to a number of different hair attachment elements such as combs and barrettes. Likewise a number of different diodes 22 and fiber sets, such as ones of different color fibers 14 can be used interchangeably.

Further many different decorative pieces 32 can be used interchangeably with replacement of pieces taking just seconds to accomplish.

It will be further appreciated that many different types of attachment devices can be used such as Velcro, or different types of clip-on devices.

Figure 5:
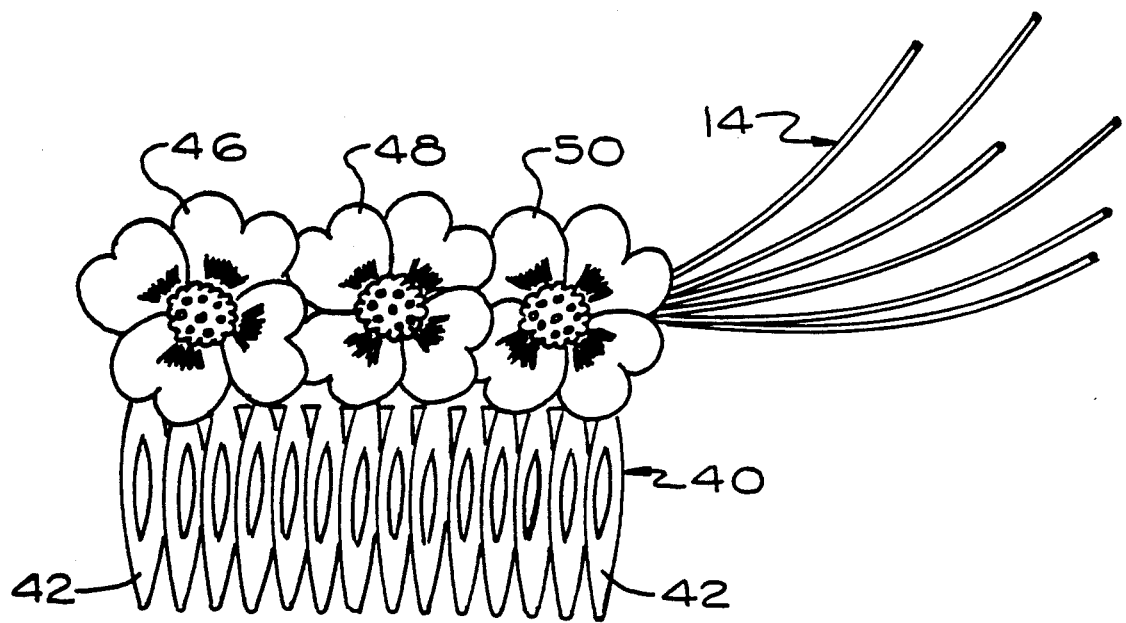
FIG. 5 is a plan view of the barrette of FIG. 4 but showing further decorative elements attached thereto.

With reference to FIGS. 4 and 5, an alternative embodiment of the invention is shown in which a hair comb 40 replaces the clip 11 of FIG. 1 as the hair attaching or fastening means. The hair comb 40 has teeth members 42 joined together by means of upper solid member 44. A light unit 25 is shown attached to the hair comb 40 as in FIG. 3 or FIG. 3A. A complementary piece 46, 48 and 50, in the form of fabric flowers is shown as applied to conceal the portions of light unit 25 comprising the diode 22 as covered by shrink tubing 26 and battery 27 as covered by casing 30.

With reference to FIGS. 6 and 7, another alternative embodiment of the invention is shown in which a hair barrette 52 replaces the hair clip 11 of FIG. 1 as the hair attaching or fastening means. The hair barrette 52 is standard having arm-like members 54 and 56 pivotable about hinge joint 58. The arm-like members 54 and 56 are joined at their ends remove from hinge joint 58 by the interaction of bent ends 60 that lock when twisted about one another in standard fashion. A light unit 25 is shown attached to the hair clip 52 as in FIG. 3 or FIG. 3A or any other suitable attachment means. Complementary piece 60, in the form of a larger fabric flower is shown as applied to conceal the light unit 25 comprising the diode 22 and battery 27. This may be mounted in accordance with the teachings of FIG. 1 or as discussed with reference to FIG. 3C. Additional complementary pieces 62, 64 and 66 may be used to conceal the barrette either partially or totally.

This invention can be provided in other forms without departing from the spirit or essential attributes thereof and accordingly, reference should be made to the following claims, rather than to the foregoing specification, as indicating the scope of the invention.

I claim:

1. A decorative hair ornament comprising:
    means for fastening the hair ornament to a person's hair;
    a light source means removably attachable to said fastening means, said light source comprising:
    optic fibers;
    a diode in juxtaposition to said optic fibers;
    housing means for said diode and at least a portion of said optic fibers; and,
    energy supplying means attachable to said diode; and decorative means removably attachable to said housing means.

2. The decorative hair ornament of claim 1, wherein the ends of the optic fibers extend outwardly from the hair fastener.

3. The decorative hair ornament of claim 1, wherein the decorative means conceal said light source means.

4. The decorative hair ornament of claim 1, wherein the light source means is temporarily attachable to said fastening means.

5. The decorative hair ornament of claim 1, wherein the diode is a light emitting diode.

6. The decorative hair ornament of claim 5, wherein the housing means for the diode and a portion of the optic fibers is constructed from a shrinkable, flexible material.

7. The decorative hair ornament of claim 6, wherein the shrinkable, flexible material is electrical shrink tubing.

8. The decorative hair ornament of claim 1, wherein the energy supplying means is a 3.5 volt battery.

9. The decorative hair ornament of claim 8, including a casing for said battery comprising a flexible material.

10. The decorative hair ornament of claim 9, wherein the flexible material is lightweight rubber.

11. The decorative hair ornament of claim 1, wherein the fastening means is a hair comb.

12. The decorative hair ornament of claim 1, wherein the fastening means is a hair clip.

13. The decorative hair ornament of claim 1, wherein the fastening means is a barrette.

14. The decorative hair ornament of claim 1, whereby said fastening means and said decorative means can be easily attached to and detached from said light source means.

15. The hair ornament according to claim 14, whereby said fastening means and said decorative means can be easily attached and detached from said light source means.

16. The hair ornament according to claim 14, wherein said fastening means and said decorative means are removably clipable to said light source means.

17. A hair ornament comprising:
    multiple means for fastening the hair ornament to a person's hair;
    a light source unit comprising optic fibers and means of illuminating said fibers, said light source being attachable and detachable to individual ones of said multiple fastening means; and,
    decorative means comprising a plurality of decorative units being attachable and detachable to said light source unit.

18. The hair ornament of claim 17, wherein said decorative means comprises fabric means.

19. A decorative hair ornament comprising:
    a light source means comprising
    optic fibers,
    a diode in juxtaposition to said optic fibers, energy supplying means attachable to said diode, and housing means for said diode and at least a portion of said optic fibers;

at least one means for fastening said hair ornament to a person's hair, said fastening means being removably attachable to said light source means; and at least one decorative means removably attachable to said light source means, whereby a plurality of fastening means and a plurality of decorative means can be attached interchangeably with said light source means.

* * * * *